J. SPAERER.
VEHICLE SIGNAL.
APPLICATION FILED SEPT. 23, 1915.
1,194,888.
Patented Aug. 15, 1916.
2 SHEETS—SHEET 1.
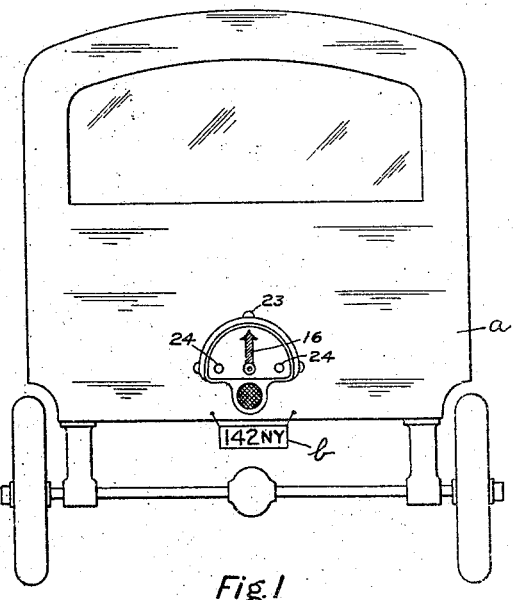
Fig. I
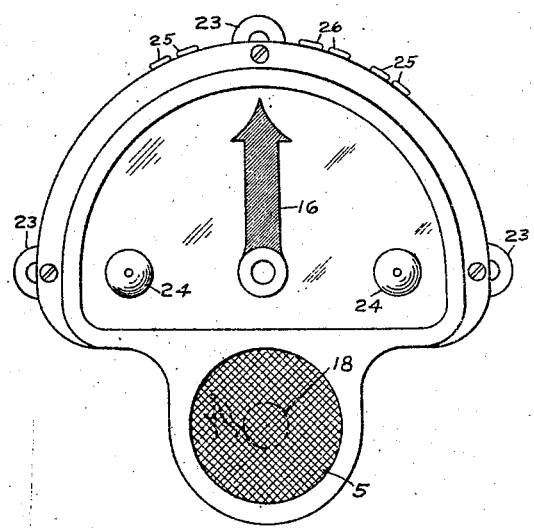
Fig. II
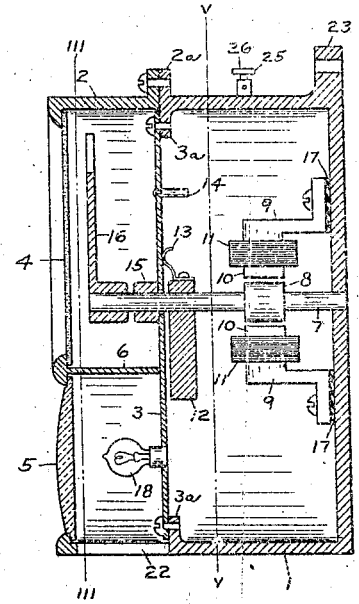
Fig. IV
WITNESSES:
John J. Hammel
Frederick Spearer
INVENTOR
John Spaerer
BY Herbert E. Peck
ATTORNEY

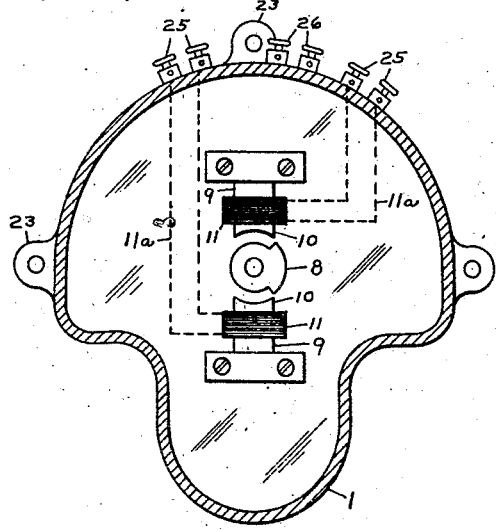
Fig. V
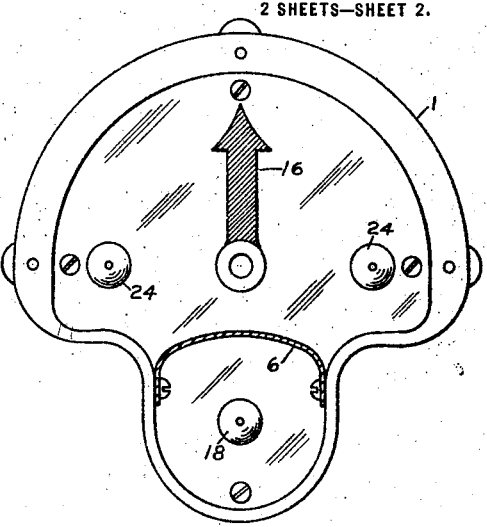
Fig. III
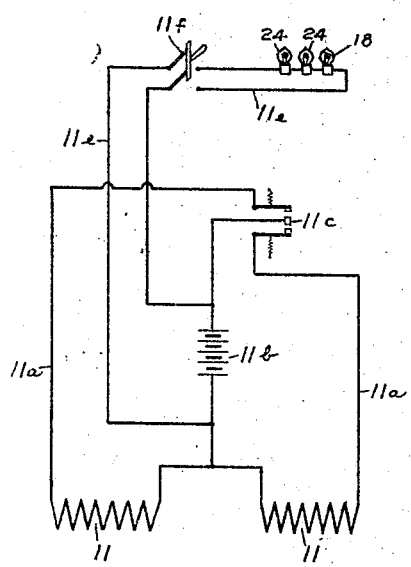
Fig. VI
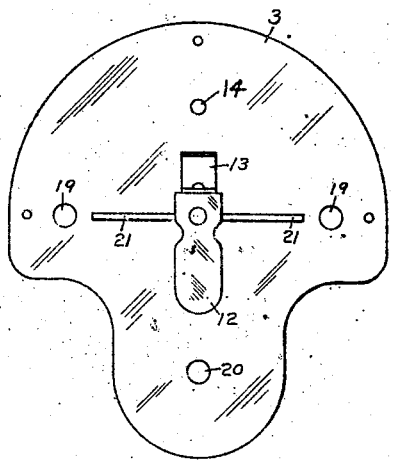
Fig. VII

UNITED STATES PATENT OFFICE.

JOHN SPAERER, OF NEWARK, NEW JERSEY.

VEHICLE-SIGNAL.

1,194,888.　　　　Specification of Letters Patent.　　Patented Aug. 15, 1916.

Application filed September 23, 1915.　Serial No. 52,238.

*To all whom it may concern:*

Be it known that I, JOHN SPAERER, a citizen of the United States, residing at Newark, in the county of Essex and State of New Jersey, have invented certain new and useful Improvements in and Relating to Vehicle-Signals, of which the following is a specification.

This invention relates to certain improvements in vehicle signals; and the objects and nature of the invention will be readily understood by those skilled in the art in the light of the following explanation of the accompanying drawings illustrating what I now believe to be the preferred embodiment or mechanical expression of my invention from among other forms, constructions and arrangements within the spirit and scope thereof.

An object of the invention is to provide exceedingly simple and efficient means of an improved character, through the medium of which a motor vehicle operator can announce to or warn others on the road that the motor vehicle is preparing to turn to either the right or left as the case may be, and thereby avoid the necessity of outstretching or extending an arm to serve as a warning signal.

A further object of the invention is to provide an improved "direction" annunciator or indicator for motor vehicles, motor boats, and the like.

A further object of the invention is to provide a combined "direction" annunciator and tail light casing for motor vehicles and the like.

A further object of the invention is to provide certain improvements in the arrangement and construction of parts and details for the production of an improved highly advantageous "direction" indicator or annunciator for motor vehicles and the like.

The invention consists in certain novel features in construction and in combinations and arrangements as more fully and particularly set forth and specified hereinafter.

Referring to the accompanying drawings:

Figure I, diagrammatically illustrates the rear of a motor vehicle equipped with a "direction" indicator or annunciator and tail light in accordance with my invention.

Fig. II, is a detail rear elevation of the annunciator. Fig. III, is a vertical section in the plane of the line III—III, Fig. IV. Fig. IV, is a vertical longitudinal section through the annunciator. Fig. V, is a cross section in the plane of the line V—V, Fig. IV. Fig. VI, shows the wiring diagram. Fig. VII, is a detail elevation.

In the particular embodiment of my invention illustrated by the accompanying drawings, I provide an approximately cylindrical box or casing, adapted to be secured to the body, or any other desired portion, of a motor vehicle $a$, to expose the indicating or annunciating means carried by the casing to the inspection of persons on the road in rear of said vehicle, and this casing is arranged adjacent to the license number plate $b$, carried by and exposed at the end of the vehicle $a$, and contains a tail light, such as electric light bulb 18, for illuminating said number plate.

In this example, the indicating means embodies a radial swingable semaphore arm, finger or pointer 16, visible at the open end or face of the casing, and carried by a rock-shaft 7 mounted in and arranged centrally and longitudinally of the casing, and provided with and carrying a soft iron or other suitable armature 8, keyed or otherwise secured thereto and projecting radially therefrom midway between the cores 10, of electromagnets 11, carried by brackets 9, secured to the end wall of the casing and insulated therefrom by suitable insulating material 17. The electromagnets are similarly arranged with respect to the shaft 7, and the armature 8, at opposite sides of the shaft and armature. The shaft 7, is preferably counterweighted to normally maintain the pointer 16, in upright vertical position and the armature 8, projecting laterally or horizontally from the shaft 7, midway between and equally spaced from the adjacent ends of the cores 10, of the electromagnets. The shaft 7, in the example illustrated, is thus counterweighted to overbalance the pointer 16 and armature 8, by counterweight 12, suitably secured to and extending radially from the shaft preferably adjacent to a wall or vertical partition of the casing. This counterweight normally depends from the shaft 7, and if so desired, can carry a friction spring 13, bearing against the said wall or partition of the casing to prevent abnormal oscillation or movement of the shaft 7, and the finger or pointer 16, inasmuch as the electromagnets 11 are normally deënergized and the shaft 7 free to oscillate or rock except for such resistance as may be offered by the spring 13 bearing against the wall or partition.

The two electromagnets have their coils 11, arranged or included in separate and independent normally open or inoperative electric circuits 11$^a$, that include any suitable source of electrical energy such as battery 11$^b$, and these circuits are provided with means whereby either circuit can be independently closed to energize its magnet coil 11, independently of and without energizing the coil of the other magnet 11. One or more manually or otherwise controlled or operated circuit closers 11$^c$, can be provided for this purpose, and this circuit closer, or these circuit closers can be located at any desirable portion of the automobile so as to be readily accessible from the automobile driver's seat. For instance, each circuit 11$^a$, can be provided with its own circuit closer in the form of a push button or the like arranged adjacent to the steering post or to the steering wheel of the motor vehicle, or if so desired, a double switch such as 11$^c$ can be provided adjacent to the steering wheel or otherwise so as to be accessible to the motor vehicle operator, and arranged to control both circuits 11$^a$, by breaking either circuit when it is swung to close the other circuit.

Whenever the operator actuates the circuit closer to close a circuit 11$^a$, the electromagnet of that circuit is thereupon energized and the armature 8 is drawn to the core of such magnet, rocking the shaft 7, and carrying the pointer 16, to a horizontal position indicating the direction in which the motor vehicle is about to turn. One of the magnets 11, will propel the shaft 7, in a direction to cause the pointer 16, to move toward the right and to thereby indicate that the motor vehicle is about to turn in that direction, while the other magnet when energized will propel the shaft 7, in the opposite direction and cause the pointer to assume a position indicating that the motor vehicle is about to turn toward the left. Whenever a circuit 11$^a$, is broken the magnet 11 of that circuit becomes deënergized, and the counterweight 12, will thereupon automatically rock the shaft to return the pointer 16, to normal upwardly extending position and the armature 8, to normal position midway between and equally spaced from the two magnet cores.

Any suitable means can be provided to limit the downward swing of the pointer 16, when pointing either to the right or the left, or in other words to limit the swing of the pointer to an arc of approximately 180 degrees. For instance, I show projections, such as pins 21, carried by and extending horizontally in opposite directions from the weight 12 and adapted to engage a stop 14, fixed to a wall or partition whenever the pointer 16, approximately reaches a horizontal position.

In the example illustrated, the rear end of the shaft 7, is mounted to rotate freely in the rear end wall of the casing 1, while the forward portion of said shaft extends forwardly through a fixed wall 3 of the casing and is supported by and rotates in a journal box 15, carried by said wall while the forwardly projecting end of the shaft has the hub of the pointer 16, fitted thereon and removably secured thereto. The pointer 16, is thus arranged in advance of the partition 3, which in effect constitutes the face plate of the annunciator and can be provided with a white surface forming a contrasting background for the pointer, which if so desired can have a black surface, so as to be clearly visible. The pointer is preferably in the shape of an arrow for the purpose of clearly indicating direction.

The casing is preferably provided with a transparent end wall or window, such as glass panel 4, through which the pointer is visible and by which it is protected. The casing is formed with a chamber or space by and between the face plate 3, and window or panel 4, and the pointer is arranged and operates in this chamber. I also preferably provide means for illuminating this chamber so that the pointer will be clearly visible at night. In the example illustrated, the plate 3, carries a pair of electric light bulbs 24, projecting forwardly therefrom into said chamber, and these bulbs are usually equally spaced from the shaft 7, on opposite sides thereof and in a horizontal line therewith so that when the pointer is in either horizontal direction indicating position it will cover one of said bulbs from vision through window 4, while the other bulb remains exposed and uncovered. The sockets for these bulbs extend forwardly through and are fitted in holes 19, in the plate 3, so that the wiring for the bulbs can be arranged within the casing and at the opposite side of the plate 3, from the chamber containing the pointer while the bulbs can be removed and applied to the sockets through said chamber and without removing said plate. Any suitable circuit or circuits can be provided for connecting said bulbs with a suitable source of electrical energy, and these circuits, or this circuit, can be provided with any suitable circuit closer or closers whereby the bulbs can be lighted and extinguished. For instance, bulbs can be connected by circuit 11$^e$, with battery 11$^b$, and provided with circuit closer or closers 11$^f$, usually arranged so as to be readily accessible from the driver's seat.

I preferably provide the casing with means for illuminating the license number plate $b$, and for otherwise serving the purpose of a tail light. For instance, I provide an electric light bulb 18, arranged on the same side of plate 3, as bulbs 24, and carried by a socket extending through hole 20, in said plate 3, the same as described in connection with bulbs 24, and if so desired, this tail light bulb can be included in the same circuit as lights 24, and controlled by the same circuit closer or other means. The bulb 18, is usually arranged below and in the same vertical plane as the shaft 7, and a radial opening or other window 22, is formed in the wall of the casing immediately below said bulb 18, so that the light rays therefrom can illuminate the license plate which is preferably arranged immediately below the annunciator.

The chamber of the casing containing the pointer 16, is subdivided by a suitable opaque shield, hood, or partition 6, to provide a chamber or inclosure for bulb 18. This shield is arranged in the lower half of the casing below the pointer and the bulbs 24, and entirely out of the path of movement of the pointer. The shield is usually in the form of a curved or segmental imperforate opaque plate or sheet at its ends fitting the wall of the casing at opposite ends of the window 22, and at one edge fitting the vertical surface of plate 3, and at the other edge the glass or other transparent panel 4.

In order to permit the bulb 18, to perform the functions of a tail light in displaying a red or danger signal at the rear of the vehicle, I preferably insert a transparent red colored glass panel or lens 5, in the outer wall of casing section 2, and immediately behind the tail light 18.

The casing 1, preferably comprises outer section 2, and cup-like section 1, closed at one end by the base wall having projecting ears 23, by which the casing can be secured to the motor vehicle, and at its opposite or outer end having internal and external annular flanges 3ª, 2ª. The outer section 2, is annular and flanged at its inner end to fit the flange 2ª, of section 1, to which it is removably secured by suitable screws or bolts. The outer end of section 1, is closed by rigid opaque plate or disk 3, which fits and is secured to flange 3ª, by suitable screws or bolts, and is arranged within and surrounded by the inner end of section 2.

The section 2, is also approximately cup-like and carries the panel 4, the glass or lens 5, and the hood 6, and is removable from section 1, and plate 3, to permit access to the bulbs and to the pointer 16, and to permit renewal and cleaning of glass panels 4 and 5.

The casing section 1 can be provided with exterior binding posts 25 to which wires can be coupled to complete the electromagnetic energizing circuits 11ª, and also with exterior binding posts 26 to which wires can be coupled to complete the electric light circuit or circuits 11ᵉ.

It is evident that various changes, modifications and variations might be resorted to without departing from the spirit and scope of my invention and hence I do not wish to limit myself to the exact disclosure hereof.

What I claim is:

1. A vehicle signal comprising a case having a face plate forming the outer wall of a compartment within the case, a rock shaft mounted in the case and extending through said compartment and through said wall and at the outer face of said wall provided with a semaphore and within the compartment provided with and carrying a friction spring bearing against said wall, a counterweight carried by said shaft and arranged within said compartment to normally hold the shaft with the semaphore in upright position, a stop carried by said wall, a member carried by said shaft to engage said stop to limit the swing of the semaphore in either direction; and electromagnetic means arranged in said compartment for rocking said shaft in either direction.

2. A combined vehicle signal and tail light comprising a casing having means providing an internal tail light compartment and an internal indicator compartment shut off from said tail light compartment, said tail light compartment provided with a lateral window and also with an outer side window, means to provide a light in said tail light compartment, said indicator compartment having an outer side window, means to provide a light in said indicator compartment, a direction indicating visible indicator in said indicator compartment, and operating and controlling means for said indicator.

3. A combined vehicle signal and tail light comprising a casing provided with a lateral window and a tail light compartment from which said window opens, said casing having an outer side window opening into said compartment, a tail light in said compartment, direction indicating signaling means in said casing and shut off from said tail light compartment, said casing having an outer side window for exposing said signaling means, and controlling devices for said signaling means.

4. A combined vehicle direction indicator and tail light comprising a casing having a face plate and an outer section providing an indicator compartment at the outer side of said face plate and a tail light compartment at the outer side of said face plate, said section provided with a partition shutting off the tail light compartment from the indicator compartment, said face plate provided with means to support a tail light in the tail light compartment and with means to support an illuminating light in the indicator compartment, said section providing outer side windows exposing said compartments and with a lateral window from the tail light compartment, and direction indicating means in the indicator compartment.

5. A vehicle signal comprising a casing having a face plate and a transparent window, a rock shaft arranged longitudinally in the casing and provided with a visible semaphore between the face plate and window, a fixed stop, said shaft being provided with radial arms behind said face plate to engage said stop, oppositely arranged electromagnets in the casing, an armature for rocking said shaft in either direction, said armature being normally arranged between said magnets, said magnets being normally deënergized and provided with independent energizing circuits, and a counterweight behind said plate and fixed to said shaft for returning said rock shaft to and for normally maintaining the same in neutral position.

6. A combined vehicle signal and tail light comprising a casing provided with a side window and an internal compartment from which said window opens, said casing having a rear signaling window opening into said compartment, means within the casing to carry an electric light bulb in said compartment, a direction indicating visible indicator in said casing, said casing having a rear window for exposing said indicator, and operating and controlling means for said indicator, said means being arranged within said casing.

7. A combined vehicle signal and tail light comprising a casing, a movable direction indicating semaphore carried thereby, actuating and controlling means for said semaphore, said casing comprising a removable section having a window at its rear side through which said semaphore is visible, said section being annular and having a side tail light window, a shield in said section behind said rear window and forming a tail light compartment into which said tail light window opens and cutting off said tail light compartment from the remaining space within said section containing said semaphore, and means to support a tail light lamp in said compartment.

8. A vehicle signal comprising a casing composed of two cup-like sections secured together, a face plate secured to one of said sections dividing said casing into compartments and provided with means adapted to receive electric light bulbs, a transparent plate secured to and closing the outer end of the other of said sections, electric light bulbs carried by the means on said face plate and between said face plate and said transparent plate, a direction indicating semaphore arranged between said plates, actuating means for said semaphore, and means removably securing said sections together whereby said section carrying said transparent plate may be removed, thereby exposing said face plate and semaphore and light bulbs to permit their removal therefrom.

In testimony whereof I affix my signature in the presence of two witnesses.

JOHN SPAERER.

Witnesses:
JOHN J. HAMMEL,
FREDERICK SPAERER.